United States Patent
Kakiuchi et al.

(10) Patent No.: US 9,252,649 B2
(45) Date of Patent: Feb. 2, 2016

(54) LINEAR ACTUATOR

(75) Inventors: Takashi Kakiuchi, Sagamihara (JP); Kousuke Satou, Sagamihara (JP)

(73) Assignee: KYB Corporation, Tokyo (JP)

( * ) Notice: Subject to any disclaimer, the term of this patent is extended or adjusted under 35 U.S.C. 154(b) by 418 days.

(21) Appl. No.: 13/821,459

(22) PCT Filed: Sep. 1, 2011

(86) PCT No.: PCT/JP2011/069945
§ 371 (c)(1),
(2), (4) Date: Mar. 7, 2013

(87) PCT Pub. No.: WO2012/035989
PCT Pub. Date: Mar. 22, 2012

(65) Prior Publication Data
US 2013/0270927 A1    Oct. 17, 2013

(30) Foreign Application Priority Data
Sep. 16, 2010 (JP) .................. 2010-207578

(51) Int. Cl.
*H02K 41/02* (2006.01)
*F16F 6/00* (2006.01)
(Continued)

(52) U.S. Cl.
CPC *H02K 41/02* (2013.01); *F16F 6/00* (2013.01); *H02K 41/031* (2013.01); *F16F 15/03* (2013.01);
(Continued)

(58) Field of Classification Search
CPC ............. H02K 1/18; H02K 1/28; H02K 5/10; H02K 5/1672; H02K 7/08; H02K 11/0021; H02K 41/02; H02K 41/031; F16F 6/00; F16F 15/03

USPC ................ 310/12.19, 12.15, 12.31, 68 B, 89; 290/1 R; 188/266.5, 267
IPC ....................................................... H02K 41/02
See application file for complete search history.

(56) References Cited

U.S. PATENT DOCUMENTS 5,495,131 A * 2/1996 Goldie ................... H02K 17/16
310/112
6,239,516 B1    5/2001 Floresta et al.
(Continued)

FOREIGN PATENT DOCUMENTS

JP    11-299216 A    10/1999
JP    2000-078828 A    3/2000
(Continued)

OTHER PUBLICATIONS

International Search Report and Written Opinion corresponding to PCT/JP2012/069945, dated Dec. 6, 2011.

*Primary Examiner* — John K Kim
(74) *Attorney, Agent, or Firm* — Hauptman Ham, LLP

(57) ABSTRACT

A linear actuator is provided with an outer tube and an inner tube inserted in the outer tube so as to be free to slide axially. A rod is erected at a central axis part of the inner tube, forming an annular space between the rod and the inner tube. Permanent magnets are retained along an axial direction in the rod, and a holder is fixed to the outer tube for retaining coils which are disposed face to face with the permanent magnets. The holder includes a cylindrical coil holding portion inserted in the annular space such that an extreme end of the cylindrical coil holding portion can move further into and backward from the annular space. The coil holding portion retains the coils within an inner peripheral surface, and a flange portion joined directly to a proximal end of the coil holding portion is fixed to the outer tube.

10 Claims, 2 Drawing Sheets

(51) Int. Cl.
*H02K 41/03* (2006.01)
*F16F 15/03* (2006.01)
*H02K 1/18* (2006.01)
*H02K 7/08* (2006.01)
*H02K 11/00* (2006.01)
*H02K 1/28* (2006.01)
*H02K 5/167* (2006.01)

(52) U.S. Cl.
CPC .. *H02K 1/18* (2013.01); *H02K 1/28* (2013.01); *H02K 5/1672* (2013.01); *H02K 7/08* (2013.01); *H02K 11/0021* (2013.01)

(56) References Cited

U.S. PATENT DOCUMENTS

| | | | | |
|---|---|---|---|---|
| 6,856,049 | B2* | 2/2005 | Hirata | H04R 9/063 310/12.16 |
| 7,023,112 | B2* | 4/2006 | Miyamoto | H02K 33/16 310/12.31 |
| 7,250,697 | B2* | 7/2007 | Beaulieu | B60G 13/14 310/12.12 |
| 7,287,638 | B1* | 10/2007 | Sommerhalter, Jr. | H02K 41/03 104/290 |
| 7,705,493 | B2* | 4/2010 | van Os | G02B 7/181 310/12.06 |
| 8,941,251 | B2* | 1/2015 | Zuo | B60G 17/06 290/1 R |
| 9,035,732 | B2* | 5/2015 | Satou | H02K 41/031 335/229 |
| 2003/0164647 | A1 | 9/2003 | Kobayashi et al. | |
| 2005/0016802 | A1* | 1/2005 | Akami | F16F 15/035 188/267 |
| 2006/0125325 | A1* | 6/2006 | Beaulieu | B60G 13/14 310/12.12 |
| 2006/0181158 | A1* | 8/2006 | Tajima | B60G 17/0157 310/12.04 |
| 2009/0058198 | A1* | 3/2009 | Finkbeiner et al. | 310/12 |
| 2010/0171459 | A1 | 7/2010 | Aso et al. | |
| 2013/0270927 | A1* | 10/2013 | Kakuchi et al. | 310/12.19 |

FOREIGN PATENT DOCUMENTS

| | | |
|---|---|---|
| JP | 2003-211088 A | 7/2003 |
| JP | 2007-274820 A | 10/2007 |
| JP | 2010-104089 A | 5/2010 |
| JP | 2010-104091 A | 5/2010 |
| WO | 2008-149805 A1 | 12/2008 |

* cited by examiner

LINEAR ACTUATOR

TECHNICAL FIELD

This invention relates to a linear actuator.

BACKGROUND ART

JP2007-274820A published by the Japan Paten Office proposes a linear actuator which is mounted on a railroad car to produce an damping force. This linear actuator is provided with a cylindrical outer tube having a bottom and a cylindrical inner tube having a bottom that is inserted so as to be free to slide in the outer tube.

The linear actuator disclosed in JP2007-274820A is provided with a columnar inner rod which is disposed on a common axis with the inner tube and fixed to a bottom portion thereof and a cylindrical outer rod which is disposed on a common axis with the outer tube and fixed to a bottom portion thereof. The inner rod is inserted into the outer rod in such a manner that the inner rod can be moved farther into and backward from the outer rod.

The linear actuator is also provided with a magnetic field generator comprising a plurality of annular permanent magnets arranged and retained along an axial direction on an outer peripheral surface of the outer rod and a plurality of coils placed face to face with the magnetic field generator. In this linear actuator, a thrust for relatively driving the inner tube and the outer tube along the axial direction is produced by a magnetic force generated between the magnetic field generator and the coils.

The linear actuator is further provided with a position sensor for detecting the relative positions of the permanent magnets and the coils and a controller for controlling the magnitude and direction of the thrust by regulating currents that flow through the individual coils. The damping force produced by the linear actuator is controlled by the controller.

The coils are retained on an inner periphery of a cylindrical holder which is fixed to an inner periphery of the inner tube. Specifically, there is formed a mating groove in which the holder is fitted in the inner periphery of the inner tube at an open end side thereof. The mating groove is made of a groove portion in which an outer periphery of the holder correctly fits, the groove portion being formed by increasing the inside diameter of the inner tube, and an annular stepped portion formed at a distal end of the groove portion.

An extreme end of the holder is fitted in the groove portion so as to abut against the stepped portion. A flange with an outer periphery having a greater diameter than the inner tube is fixed to an open end of the inner tube. The holder is thereby prevented from falling off from the open end of the inner tube.

When the linear actuator is most extended, the flange comes into contact with a bearing holder provided on an inner periphery of the outer tube at an open end thereof. The bearing holder retains a bearing that slides an outer periphery of the inner tube. When the linear actuator is most contracted, on the other hand, the flange comes into contact with the bottom of the outer tube, whereby the stroke of the inner rod of the linear actuator is restricted.

SUMMARY OF INVENTION

In the linear actuator of JP2007-274820A, the holder retaining the coils is sandwiched between the stepped portion of the inner tube and the flange, so that a load produced when the flange is fixed acts upon the holder. Consequently, the entirety of the holder is tightly pressed, potentially posing a risk of causing a displacement of the coils retained by the holder. In order to maintain concentricity of the coils against the load applied for fixing the flange, it is necessary that the entire holder be made of a high-strength material that can withstand the load and, as a result, the holder has a low degree of design freedom.

It is therefore an object of this invention to improve the degree of design freedom of a holder of a linear actuator.

To achieve the object described above, a linear actuator includes an outer tube and an inner tube inserted into the outer tube, the linear actuator generating a thrust for relatively displacing the outer tube and the inner tube along an axial direction. The linear actuator includes a rod erected at a central axis part of the inner tube, forming an annular space between the rod and the inner tube, a plurality of permanent magnets arranged in the rod along the axial direction, and a holder fixed to the outer tube and retaining a plurality of coils facing the permanent magnets. The holder includes a cylindrical coil holding portion inserted into the annular space so as to be free to displace in the axial direction with respect to the annular space, the coil holding portion retaining the coils within an inner peripheral surface thereof, and a flange portion joined directly to a proximal end of the coil holding portion and fixed to the outer tube.

The details as well as other features and advantages of this invention are set forth in the remainder of the specification and are shown in the accompanying drawings.

DESCRIPTION OF EMBODIMENTS

Figure 1:
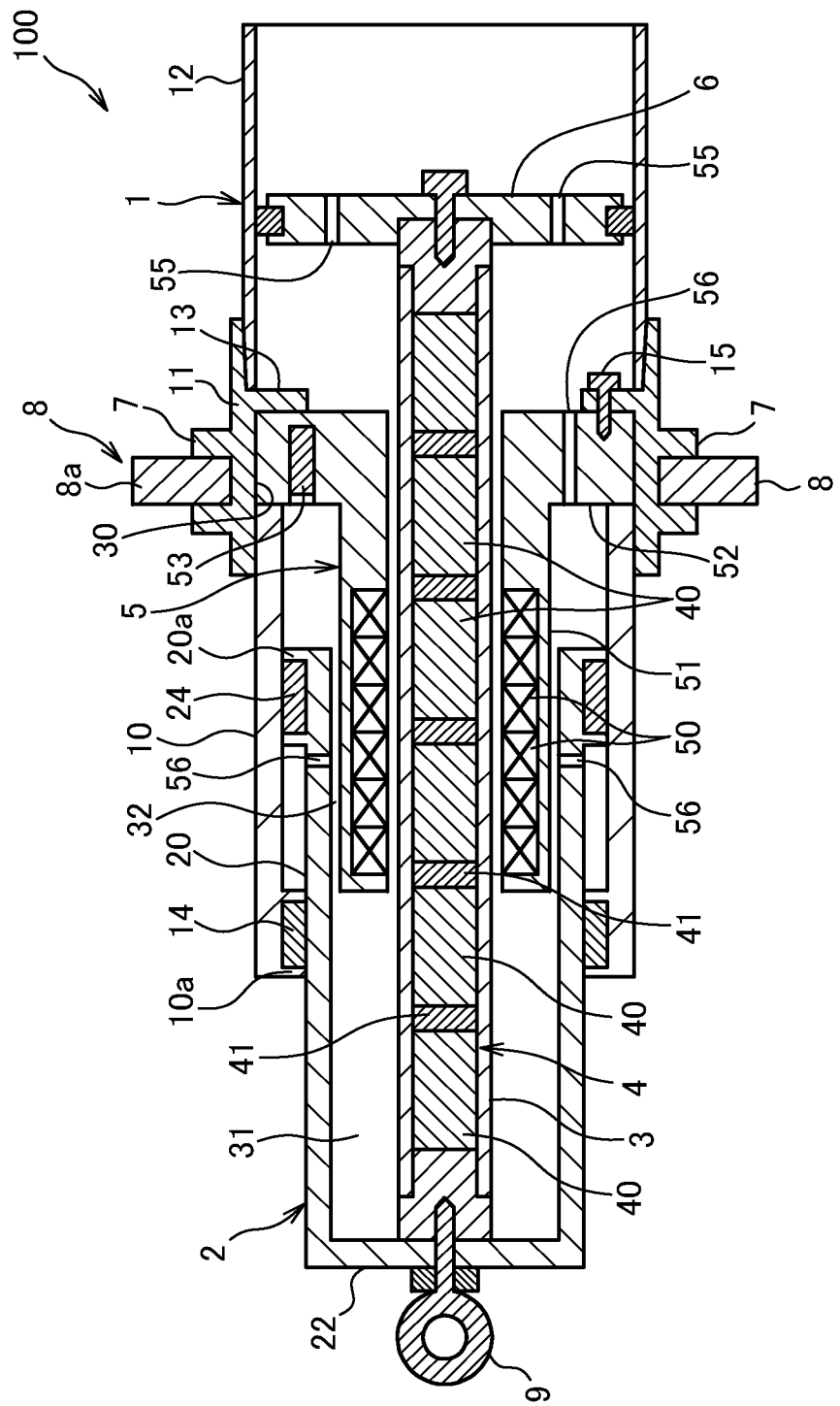
FIG. 1 is a longitudinal cross-sectional view of a linear actuator according to a first embodiment of this invention.

A linear actuator 100 according to a first embodiment of this invention will be described hereunder with reference to the drawing.

Referring to FIG. 1, the construction of the linear actuator 100 will be described.

The linear actuator 100 is a damping linear actuator that is provided on a motor vehicle, a railroad car, or the like. The linear actuator 100 is provided with a cylindrical outer tube 1, a cylindrical inner tube 2 having a bottom and inserted in the outer tube 1 so as to be free to slide therewith, and a rod 3 erected at a central axial part of the inner tube 2, forming an annular space 31 between the rod 3 and the inner tube 2.

The linear actuator 100 is also provided with a magnetic field generator 4 comprising a plurality of permanent magnets 40 arranged and retained along an axial direction in the rod 3, a plurality of coils 50 disposed to face the magnetic field generator 4, and a holder 5 retaining the coils 50. The holder 5 is fixed to the outer tube 1. The linear actuator 100 relatively causes the outer tube 1 and the inner tube 2 to be displaced from each other along the axial direction according to a magnetic force generated between the magnetic field generator 4 and the coils 50.

In the following description of the outer tube 1 and its related elements, an open end side into which the inner tube 2 is inserted is referred to as an extreme end and an opposite side is referred to as a proximal end. Similarly, in the description of the inner tube 2 and its related elements, an open end side inserted into the outer tube 1 is referred to as an extreme end and an opposite side is referred to as a proximal end.

The holder 5 comprises a cylindrical coil holding portion 51 retaining the coils 50 within an inner surface and a flange portion 52 joined directly to a proximal end of the coil holding portion 51. The holder 5 is inserted in the annular space 31 in such a manner that an extreme end of the coil holding portion 51 can be moved farther into and backward from the annular space 31. The holder 5 is fixed to the outer tube 1 via the flange portion 52.

Respective components of the linear actuator 100 will be described in detail below.

The outer tube 1 and the inner tube 2 are joined to two relatively moving members, such as a vehicle body and a movable member, respectively.

The outer tube 1 forms an outer shell of the linear actuator 100 together with the inner tube 2. The outer tube 1 is provided with a trunnion mechanism 8 comprising a pair of pivots 8a that project from the outer tube 2 radially outward and away from each other. The outer tube 1 is supported by the trunnion mechanism 8 so as to be free to swing about with respect to the vehicle body.

The inner tube 2 is joined to the movable member via an eye member 9 which is attached to an outer surface of the bottom portion of a proximal end of the outer tube 1.

A conventional linear actuator is joined to both the vehicle body and the movable member via eye members provided at both ends of the linear actuator.

In contrast, the eye member 9 is provided at only one end of the linear actuator 100 and the other end thereof is supported by the trunnion mechanism 8. This arrangement makes it possible to shorten a mounting length of the linear actuator 100, thereby providing enhanced ease of installation. The mounting structure of the linear actuator 100, however, is not limited to this arrangement but may be varied as required.

In the linear actuator 100, the outer tube 1 and the holder 5 which are supported by the vehicle body constitute stationary elements while the inner tube 2, the rod 3 and a rod guide 6 which are joined to the movable member constitute movable elements. The linear actuator 100 damps vibrations transmitted from a road/rail surface to the vehicle body by causing the stationary elements and the movable elements to relatively displace.

The outer tube 1 comprises a cylindrical frame 10 of which inner periphery retains a bearing 14 which slides along an outer peripheral surface of the inner tube 2, a cylindrical base 11 having an annular supporting member 13 projecting inward and a pair of brackets 7 formed on an outer periphery of the base 11, and a cylindrical case 12 having an inner peripheral surface along which an outer periphery of the rod guide 6 slides.

The bearing 14 is retained in a bearing accommodating part 10a formed on an inner periphery of the outer tube 1. The bearing accommodating part 10a is formed at an end portion of the outer tube 1 in which the inner tube 2 is inserted. Proximal end parts of the pivots 8a constituting the trunnion mechanism 8 are fitted in the brackets 7 of the base 11.

The frame 10, the base 11 and the case 12 are arranged in series in this order. The frame 10 is screwed in an inner periphery of one end of the base 11 and the case 12 is screwed in an inner periphery of the other end of the base 11. With this arrangement, the frame 10, the base 11 and the case 12 are joined on a common axis.

The outer tube 1 is so structured as to sandwich the flange portion 52 of the holder 5 between the annular supporting member 13 of the base 11 and the frame 10, whereby the holder 5 is fixed to the outer tube 1. When the linear actuator 100 generates a thrust which pulls the inner tube 2 into the outer tube 1, the frame 10 prevents the holder 5 from coming off therefrom.

A bolt 15 which prevents the base 11 and the holder 5 from turning relative to each other is screwed into the base 11, passing through the annular supporting member 13. The holder 5 is kept from turning about an axis thereof by this bolt 15.

The outer tube 1 is divided into the frame 10, the base 11 and the case 12. The outer tube 1 can be easily assembled by merely screwing the frame 10 and the case 12 into the base 11. It is possible to select materials and determine manufacturing precision of the frame 10, the base 11 and the case 12 in accordance with purposes of use of the respective elements.

The linear actuator 100 may be constructed such that only the frame 10 and the base 11 upon which a lateral force directed in a radial direction or an axial force is exerted, for example, are made of a high-strength material.

It is possible to choose the configuration of the outer tube 1 as required. For example, the outer tube may be formed into a one-piece structure instead of separate pieces. Also, the outer tube may be formed into a structure made of two pieces or four pieces or more.

As shown in FIG. 1, the inner tube 2 includes a movable cylindrical portion 20 retaining a ring-shaped bearing 24 which slides along an inner peripheral surface of the frame 10 of the outer tube 1 and a bottom portion 22 which closes one end of the movable cylindrical portion 20 with the eye member 9 fixed to an outer surface of the bottom portion 22. The bearing 24 is retained in a bearing accommodating part 20a formed in the movable cylindrical portion 20. The bearing accommodating part 20a is formed on an outer periphery of an end portion of the movable cylindrical portion 20.

As the inner tube 2 is supported by the bearing 14 and the bearing 24 and slides along the inner periphery of the outer tube 1, it is possible for the inner tube 2 to move forward into and backward from the outer tube 1 while exhibiting sufficient stiffness against a lateral force that acts in radial directions.

The rod 3 is erected at the central axial part of the inner tube 2 with a proximal end of the rod 3 fixed to an inner surface of the bottom portion 22 of the inner tube 2. The rod 3 passes through a hollow central axial part of the holder 5 which is fixed to the inner periphery of the outer tube 1. The rod 3 is formed into a cylindrical shape, including the magnetic field generator 4 comprising the plurality of permanent magnets 40 which are arranged along the axial direction in the hollow part of the rod 3.

The linear actuator 100 is configured such that the rod 3 is erected in the central axial part of the inner tube 2 as mentioned above. Therefore, even if a lateral force acts on the inner tube 2 in a radial direction, causing the inner tube 2 to become distorted, this distortion is never transmitted to the rod 3. Accordingly, it is possible to prevent breakage of the permanent magnets 40 caused by the distortion of the inner tube 2.

The permanent magnets 40 are each formed into a rodlike shape. The permanent magnets 40 are magnetized such that north (N) and south (S) poles are located along their axial direction. The permanent magnets 40 are arranged along the axial direction and accommodated within the rod 3 in such a state that magnetic poles of any adjacent permanent magnets 40 having the same polarity are oriented to face each other. Also, a yoke 41 is placed between the adjacent permanent magnets 40.

In the meantime, the arrangement of the permanent magnets 40 is not limited to the above-described one but ring-shaped permanent magnets of which N and S poles are located along the axial direction, or ring-shaped permanent magnets which are polarized along inward and outward directions, may be attached to an outer periphery of the rod 3. That is to say, it is just necessary that the permanent magnets 40 be arranged such that the N and S poles are alternately located along the axial direction of the rod 3. Also, it is not essentially needed to provide the yokes 41.

Held at an extreme end of the rod 3 is the rod guide 6 of which outer periphery slides along the inner peripheral surface of the case 12 of the outer tube 1. The provision of the rod guide 6 makes it possible to prevent the extreme end of the rod 3 from swinging in radial directions when the rod 3 moves within the outer tube 1 along the axial direction as a result of a sliding action of the inner tube 2. This means that it is possible to prevent lateral swing motion of the rod 3.

The rod guide 6 prevents the rod 3 from interfering with the holder 5 by laterally swinging when the linear actuator 100 extends or contracts as discussed above, so that the rod guide 6 serves to maintain a fixed distance between the permanent magnets 40 accommodated in the rod 3 and the coils 50 held by the holder 5. Consequently, the linear actuator 100 generates a thrust in a stable fashion. In a case where the linear actuator 100 is constructed such that the permanent magnets 40 are retained on the outer periphery of the rod 3, the rod guide 6 prevents the permanent magnets 40 from interfering with the holder 5.

The holder 5 includes the cylindrical coil holding portion 51 retaining the plurality of coils 50 facing the permanent magnets 40 within the inner surface and the flange portion 52 sandwiched between the annular supporting member 13 and the frame 10 of the outer tube 1.

The coil holding portion 51 moves forward into and backward from the annular space 31 formed between the rod 3 and the inner tube 2 as a result of a relative displacement of the outer tube 1 and the inner tube 2. Also, there is a specific gap 32 between an outer peripheral surface of the coil holding portion 51 and an inner peripheral surface of the inner tube 2. This serves to prevent distortion of the inner tube 2 from being transmitted to the coil holding portion 51 even when the inner tube 2 is distorted due to a load exerted thereupon in a radial direction.

Thus, even if the inner tube 2 is distorted by the load exerted thereupon in a radial direction, the distortion of the inner tube 2 is not transmitted to either the rod 3 retaining the permanent magnets 40 or the coil holding portion 51 retaining the coils 50 and, therefore, the distance between the permanent magnets 40 and the coils 50 is kept constant and this enables the linear actuator 100 to generate a stable thrust.

It should be noted that the dimension of the gap 32 may be set at an appropriate amount within a range in which the distortion of the inner tube 2 can be kept from being transmitted to the coil holding portion 51.

The coils 50 are arranged within a range of the axial length of the magnetic field generator 4 so that the coils 50 are always positioned to face the magnetic field generator 4 within the range of the stroke of the rod 3 of the linear actuator 100. This arrangement makes it possible to prevent the occurrence of a situation where the thrust produced by the linear actuator 100 becomes insufficient.

Although a total of six coils 50 are shown in FIG. 1, the invention is not limited thereto but the number of the coils 50 is set to a value suited to the thrust produced by the linear actuator 100 and a method of electrical conduction.

The flange portion 52 is connected directly to the proximal end of the coil holding portion 51. The flange portion 52 does not hold the coils 50 and an outer periphery of the flange portion 52 is made to be retained on the inner periphery of the base 11 in the outer tube 1. The outer periphery of the flange portion 52 and the inner periphery of the base 11 are matched together and the holder 5 and the outer tube 1 are arranged coaxially with each other. A cylindrical surface on which the outer periphery of the flange portion 52 and the inner periphery of the base 11 are matched is hereinafter referred to as a reference surface 30.

The holder 5 is formed such that an inner peripheral surface of the coil holding portion 51 thereof becomes coaxial with the reference surface 30, whereby the coils 50 retained on the inner surface of the coil holding portion 51 are arranged coaxially with the reference surface 30.

The base 11 includes a screw part on the side of the frame 10 and a screw part on the side of the case 12 which are arranged coaxially with the reference surface 30. The frame 10 and the case 12 are screwed into the respective screw parts of the base 11 so that the frame 10, the base 11 and the case 12 are together arranged on a common axis.

As the inner tube 2 is fitted in the inner periphery of the frame 10 in sliding contact therewith and the rod 3 is placed to be erected at the central axial part of the inner tube 2, it is made possible to arrange the inner tube 2 and the rod 3 coaxially with the reference surface 30.

If respective components are designed using the reference surface 30, on which the outer periphery of the flange portion 52 and the inner periphery of the base 11 are matched, as a reference surface, the components can be arranged easily on a common axis.

If, on the other hand, the outer periphery of the flange portion 52 and the inner periphery of the base 11 are not matched, thus producing an eccentricity of axes therebetween, there arises a risk of developing a problem that axes of the respective components may be displaced from one another. For this reason, it is necessary to machine the outer periphery of the flange portion 52 and the inner periphery of the base 11 with such a degree of precision that will satisfy a required level of concentricity.

In the conventional linear actuator, an inner periphery of the groove portion of the inner tube and the outer periphery of the holder fit together, and this surface where both are fitted together serves as a reference surface. Since the reference surface is formed along the entire length of the holder in this linear actuator, the reference surface has a large area and, therefore, it is difficult to machine the inner tube and the holder.

In contrast, the reference surface 30 is formed only on the outer periphery of the flange portion 52 of the holder 5 in the linear actuator 100 so that the reference surface 30 has a small area. It is therefore easy to machine the linear actuator 100.

The holder 5 is fixed to the outer tube 1 with the flange portion 52 sandwiched between the frame 10 and the base 11. Therefore, a load applied for fixing the holder 5 to the outer tube 1 acts only on the flange portion 52 and not on the coil holding portion 51. Thus, it is sufficient to form only the flange portion 52 with a high-strength material which can withstand the load and, as a consequence, the degree of freedom in design of the holder 5 is improved as compared to the conventional one.

A sensor unit 53 for detecting relative positions of the coils 50 and the permanent magnets 40 are embedded in the flange portion 52.

An unillustrated controller which serves as control means is installed in the linear actuator 100. The controller controls the magnitude and direction of a current flowed into each of the coils 50 on the basis of information on the relative positions of the coils 50 and the permanent magnets 40 detected by the sensor unit 53. The thrust generated by the linear actuator 100 and the direction in which the thrust is generated are controlled in this way. In the meantime, it is possible to employ an arrangement in which the linear actuator 100 is not furnished with the controller and the thrust generated by the linear actuator 100 and the direction in which the thrust is generated are controlled by a controller installed on the vehicle.

As the sensor unit 53 is provided within the flange portion 52 of the holder 5 as mentioned above, it is not necessary to additionally provide the sensor unit 53 on the outside of the linear actuator 100. Also, as the coils 50 are not provided on the flange portion 52 in which the sensor unit 53 is disposed, it is made possible to use, for example, a magnetic sensor in the sensor unit 53. Meanwhile, the mounting site of the sensor unit 53 is not limited to the aforementioned location but may be chosen as required.

In the conventional linear actuator, a flange which retains the built-in coils comes into contact with a bearing accommodating part of the outer tube when the linear actuator is most extended, whereas the flange comes into contact with the bottom portion of the outer tube when the linear actuator is most contracted. In this case, it is necessary to form the holder that retains the coils to have such a strength that enables the holder to maintain the concentricity of the coils even when a force is acted upon the holder as a result of contact of the holder with the bottom portion of the outer tube.

In the case of the linear actuator 100, when it is most contracted, the flange portion 52 is comes into contact with the bearing accommodating part 20a of the inner tube 2 and the linear actuator 100 is prevented from further contracting. When the linear actuator 100 is most extended, on the other hand, the bearing accommodating part 20a of the inner tube 2 comes into contact with the bearing accommodating part 10a of the outer tube 1 and the linear actuator 100 is prevented from further extending.

Therefore, the force produced by the aforementioned contact action when the linear actuator 100 is most contracted or extended is not transmitted to the coils 50 or the rod guide 6. Since the flange portion 52 which does not retain any coils 50 serves as a stopper, it is needed to form only the flange portion 52 to have a enough strength to withstand the force produced by the contact action when the linear actuator 100 is most contracted.

Inlet/outlet holes 55 are formed in the rod guide 6. Also, conducting holes 56 are formed individually in the movable cylindrical portion 20 of the inner tube 2 and in the flange portion 52 of the holder 5. When the linear actuator 100 makes an extending or contracting action, air is introduced into or discharged from an internal space of the linear actuator 100 through the inlet/outlet holes 55 and moves therewithin through the conducting holes 56, thereby enabling a smooth extending or contracting action of the linear actuator 100.

Locations where the inlet/outlet holes 55 and the conducting holes 56 are provided and the numbers thereof may be determined arbitrarily as long as the inlet/outlet holes 55 and the conducting holes 56 enable extending and contracting actions of the linear actuator 100 as well as compensation for variations in volumetric capacity of the internal space of the linear actuator 100 that will occur as a result of the extending and contracting actions.

The above-described embodiment produces the following advantages.

The holder 5 has the cylindrical coil holding portion 51 which retains the coils 50 on the inner peripheral surface and the flange portion 52 which retains no coils 50. The holder 5 is fixed to the outer tube 1 with the flange portion 52 sandwiched between the frame 10 and the base 11. For this reason, the load exerted on the holder 5 for fixing the same to the outer tube 1 acts only on the flange portion 52 and not on the coil holding portion 51. Thus, it is needed to form only the flange portion 52 with a high-strength material that can withstand the load and, as a consequence, the degree of freedom in design of the holder 5 is improved as compared to the conventional one.

Figure 2:
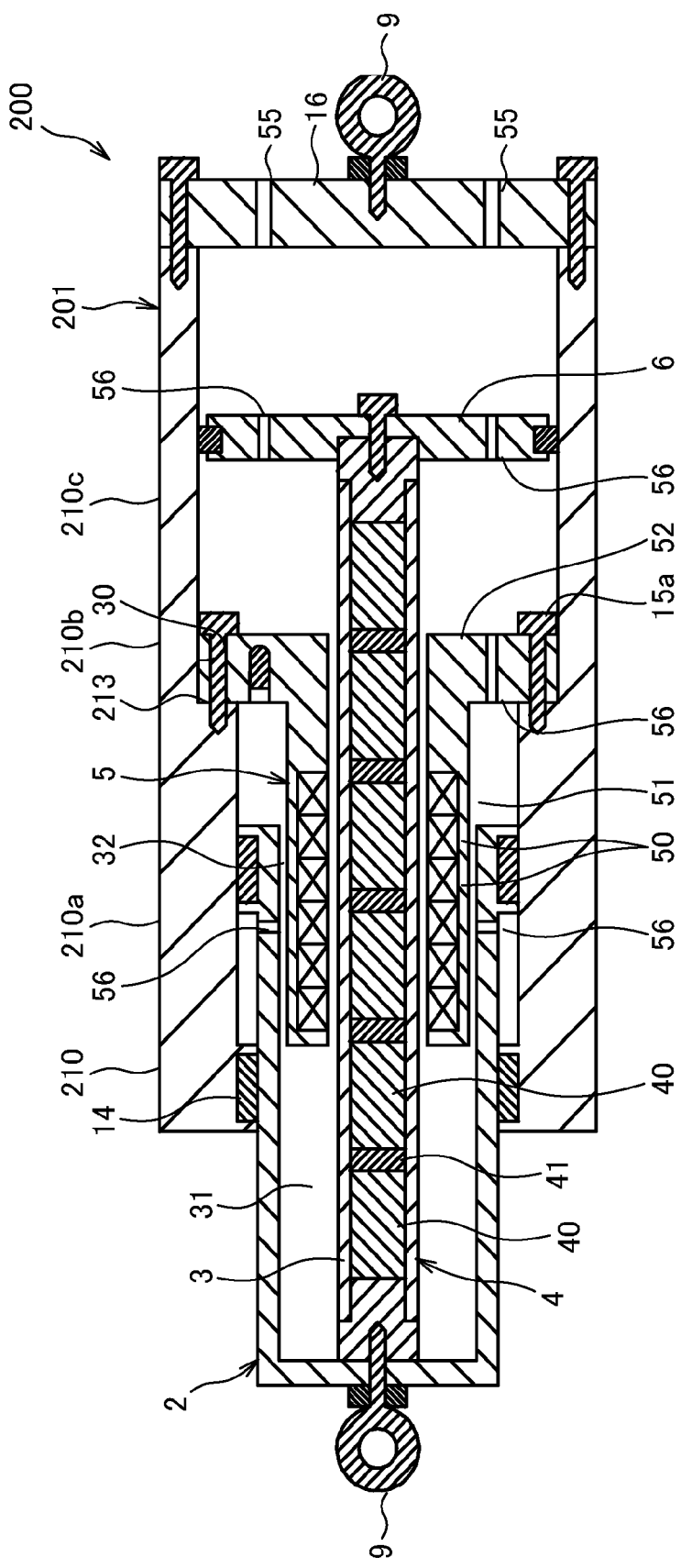
FIG. 2 is a longitudinal cross-sectional view of a linear actuator according to a second embodiment of this invention.

Referring to FIG. 2, a linear actuator 200 according to a second embodiment of this invention will now be described. The following discussion focuses on points that differ from the linear actuator 100 of the above-described first embodiment, wherein constituent elements identical to those of the linear actuator 100 are designated by the same reference signs and a description of such elements is omitted below.

The linear actuator 200 differs from the linear actuator 100 in the structure for installation thereof to a vehicle body, the structure for installation of the holder 5 and in the structure of an outer tube 201.

The outer tube 201 is formed into a cylindrical shape having a closed end and an open end into which the inner tube 2 is inserted. The outer tube 201 comprises a cylindrical portion 210 and a bottom portion 16 which closes one end of the cylindrical portion 210.

Provided on an outer surface of the bottom portion 16 is an eye member 9 for establishing a connection to the vehicle body. Opposite ends of the linear actuator 200 are joined to the vehicle body and a movable member by the eye member 9 on the bottom portion 16 and another eye member 9 provided on the inner tube 2, respectively. This arrangement makes it possible to damp vibrations transmitted from the road surface to the vehicle body by causing the linear actuator 200 to extend and contract.

The cylindrical portion 210 comprises a frame portion 210a having an inner periphery along which the inner tube 2 slides, a base portion 210b having an inner periphery with which the outer periphery of the flange portion 52 matches, and a case portion 210c having an inner periphery along which the outer periphery of the rod guide 6 slides.

The frame portion 210a, the base portion 210b and the case portion 210c are formed on a common axis. The inner surface of the frame portion 210a is formed to have a smaller diameter as compared to the inner peripheries of the base portion 210b and the case portion 210c. There is formed an annular stepped portion 213 at a boundary between the frame portion 210a and the base portion 210b.

The flange portion 52 of the holder 5 is fixed to the stepped portion 213 by bolts 15a. These bolts 15a serve a dual function of preventing the holder 5 from coming off and revolving. In this case, it is necessary for the bolts 15a to have higher strength as compared to the bolt 15 of FIG. 1 which is used for antirotation purposes only. It is therefore needed to increase the diameter or the number of the bolts 15a.

An annular surface in which the inner periphery of the base portion 210b and the outer periphery of the flange portion 52 of the holder 5 are matched with each other is regarded as a reference surface 30, and individual constituent components are designed using the reference surface 30 as the reference surface. Consequently, it becomes possible to coaxially arrange the constituent components as in the case of the linear actuator 100. Also, it is easy to machine the linear actuator 200 because the area of the reference surface 30 can be made smaller as compared to the conventional linear actuator.

In the linear actuator 200, the holder 5 is fixed to the outer tube 201 as the flange portion 52 is fastened by the bolts 15a. Therefore, a load applied for fixing the holder 5 to the outer tube 1 acts only on the flange portion 52 and not on the coil holding portion 51. Thus, it is sufficient to form only the flange portion 52 with a high-strength material which can withstand the load and, as a consequence, the degree of freedom in design of the holder 5 is improved as compared to the conventional one.

In the case of the outer tube 201, the base portion 210b and the case portion 210c are formed to have the same inside diameter. This means that the inner periphery of the case portion 210c is also formed to match the outer periphery of the flange portion 52 of the holder 5. The linear actuator 200 is assembled by inserting the holder 5 from an open end of the case portion 210c in a state where the bottom portion 16 is not attached.

The case portion 210c may be formed to have a larger inside diameter as compared to the base portion 210b. In this case, the outer periphery of the flange portion 52 does not match the inner periphery of the case portion 210c, so that the case portion 210c does not require high machining accuracy. It is therefore easy to machine the outer tube 201.

In the linear actuator 200, inlet/outlet holes 55 are formed in the bottom portion 16 of the outer tube 201 and conducting holes 56 are formed individually in the rod guide 6, the inner tube 2 and the flange portion 52 of the holder 5. When the linear actuator 200 makes an extending or contracting action, air is introduced into or discharged from an internal space of the linear actuator 200 through the inlet/outlet holes 55 and moves therewithin through the conducting holes 56. This enables a smooth extending or contracting action of the linear actuator 200.

Although the invention has been described above with reference to certain embodiments, the invention is not limited to the embodiments described above. Modifications and variations of the embodiments described above will occur to those skilled in the art, within the scope of the claims.

The contents of application No. 2010-207578, with a filing date of Sep. 16, 2010 in Japan, are hereby incorporated by reference.

The embodiments of this invention in which an exclusive property or privilege is claimed are defined as follows:

The invention claimed is:

1. A linear actuator, comprising:
an outer tube and an inner tube inserted into the outer tube, the linear actuator configured to generate a thrust for relatively displacing the outer tube and the inner tube along an axial direction;
a rod erected at a central axis part of the inner tube;
an annular space between the rod and the inner tube;
a plurality of permanent magnets arranged in the rod along the axial direction; and
a holder fixed to the outer tube and retaining a plurality of coils facing the permanent magnets,
wherein the holder comprises:
a cylindrical coil holding portion inserted into the annular space so as to be free to displace in the axial direction with respect to the annular space, the coil holding portion retaining the coils within an inner peripheral surface thereof; and
a flange portion joined directly to a proximal end of the coil holding portion and fixed to the outer tube, and
wherein a gap is formed between the coil holding portion and the inner tube, and the coil holding portion is supported only by the flange portion.

2. The linear actuator as defined in claim 1, wherein an outer periphery of the flange portion matches an inner periphery of the outer tube.

3. The linear actuator as defined in claim 1, wherein
the outer tube comprises an outer tube bearing accommodating part on an inner periphery of an end portion of the outer tube into which the inner tube is inserted, the outer tube bearing accommodating part retaining an outer tube bearing which is slidable along an outer periphery of the inner tube;
the inner tube comprises an inner tube bearing accommodating part on an outer periphery of an end portion of the inner tube that is inserted into the outer tube, the inner tube bearing accommodating part retaining an inner tube bearing which is slidable along an inner periphery of the outer tube;
a further extension of the linear actuator is restricted when the inner tube bearing accommodating part comes into contact with the outer tube bearing accommodating part; and
a further contraction of the linear actuator is restricted when the inner tube bearing accommodating part comes into contact with the flange portion.

4. The linear actuator as defined in claim 1, wherein
a proximal end of the rod is fixed to the inner tube, and
an extreme end of the rod retains a rod guide which has an outer periphery slidable along an inner periphery of the outer tube.

5. The linear actuator as defined in claim 3, wherein
the outer tube comprises
a cylindrical frame retaining, in an inner periphery thereof, the outer tube bearing, and
a base having an annular supporting member projecting inwardly, and
the holder is sandwiched between the frame and the annular supporting member.

6. The linear actuator as defined in claim 5, wherein
the outer tube further comprises a cylindrical case which is screwed into the base,
an extreme end of the rod retains a rod guide, and
an outer periphery of the rod guide is slidable along an inner periphery of the case.

7. The linear actuator as defined in claim 5, further comprising:
an eye member attached to a proximal end of the inner tube; and
a trunnion mechanism attached to the outer tube, the trunnion mechanism comprising a pair of pivots projecting from the outer tube radially outward and away from each other.

8. The linear actuator as defined in claim 1, wherein the holder comprises a sensor unit embedded in the flange portion for detecting relative positions of the coils and the permanent magnets.

9. A linear actuator comprising an outer tube and an inner tube inserted into the outer tube, the linear actuator generating a thrust for relatively displacing the outer tube and the inner tube along an axial direction, the linear actuator further comprising:
a rod erected at a central axis part of the inner tube, forming an annular space between the rod and the inner tube;
a plurality of permanent magnets arranged in the rod along the axial direction; and
a holder fixed to the outer tube and retaining a plurality of coils facing the permanent magnets, wherein
the holder comprises:
a cylindrical coil holding portion inserted into the annular space so as to be free to displace in the axial direction with respect to the annular space, the coil holding portion retaining the coils within an inner peripheral surface thereof; and a flange portion joined directly to a proximal end of the coil holding portion and fixed to the outer tube;

the outer tube comprises an outer tube bearing accommodating part on an inner periphery of an end portion of the outer tube into which the inner tube is inserted, the outer tube bearing accommodating part retaining an outer tube bearing which slides along an outer periphery of the inner tube;

the inner tube comprises an inner tube bearing accommodating part on an outer periphery of an end portion of the inner tube that is inserted into the outer tube, the inner tube bearing accommodating part retaining an inner tube bearing which slides along an inner periphery of the outer tube;

a further extension of the linear actuator is restricted when the bearing accommodating part of the inner tube comes into contact with the outer tube bearing accommodating part; and a further contraction of the linear actuator is restricted when the inner tube bearing accommodating part comes into contact with the flange portion.

10. A linear actuator comprising an outer tube and an inner tube inserted into the outer tube, the linear actuator generating a thrust for relatively displacing the outer tube and the inner tube along an axial direction, the linear actuator further comprising:

a rod erected at a central axis part of the inner tube, forming an annular space between the rod and the inner tube;

a plurality of permanent magnets arranged in the rod along the axial direction; and a holder fixed to the outer tube and retaining a plurality of coils facing the permanent magnets, wherein the holder comprises:
 a cylindrical coil holding portion inserted into the annular space so as to be free to displace in the axial direction with respect to the annular space, the coil holding portion retaining the coils within an inner peripheral surface thereof; and
 a flange portion joined directly to a proximal end of the coil holding portion and fixed to the outer tube;

a proximal end of the rod is fixed to the inner tube, and an extreme end of the rod retains a rod guide of which outer periphery slides along an inner periphery of the outer tube;

the outer tube comprises a cylindrical frame retaining in the inner periphery thereof the outer tube bearing, and a base having an annular supporting member formed to project inwardly, and the holder is sandwiched between the frame and the annular supporting member; and the outer tube further comprises a cylindrical case which is screwed into the base, and the outer periphery of the rod guide slides along an inner periphery of the case.

* * * * *